(12) United States Patent
Sugimoto

(10) Patent No.: US 7,478,623 B2
(45) Date of Patent: Jan. 20, 2009

(54) CONTROL DEVICE OF HYBRID VEHICLE

(75) Inventor: Hitoki Sugimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/976,014

(22) Filed: Oct. 19, 2007

(65) Prior Publication Data

US 2008/0103682 A1    May 1, 2008

(30) Foreign Application Priority Data

Oct. 25, 2006    (JP)    ............................. 2006-290222

(51) Int. Cl.
*F02P 5/00* (2006.01)
*G06F 19/00* (2006.01)

(52) U.S. Cl. ............. 123/406.29; 123/435; 123/406.11; 701/111

(58) Field of Classification Search ................. 123/434, 123/435, 406.11, 406.21, 406.29, 406.34, 123/406.37–406.39; 701/111, 112, 113
See application file for complete search history.

(56) References Cited

U.S. PATENT DOCUMENTS

| | | | |
|---|---|---|---|
| 6,860,244 B2 * | 3/2005 | Glugla et al. ............. | 123/78 E |
| 7,032,571 B2 * | 4/2006 | Takama et al. ......... | 123/406.23 |
| 7,275,426 B2 * | 10/2007 | Lahti et al. ................ | 73/114.32 |
| 7,284,506 B1 * | 10/2007 | Sun et al. ..................... | 123/1 A |
| 7,305,819 B2 * | 12/2007 | Yasui .......................... | 60/285 |
| 2004/0089253 A1 * | 5/2004 | Glugla et al. .............. | 123/78 E |
| 2005/0145217 A1 * | 7/2005 | Takama et al. ......... | 123/339.11 |
| 2006/0142932 A1 * | 6/2006 | Yasui .......................... | 701/114 |
| 2007/0089697 A1 * | 4/2007 | Hara et al. ................ | 123/90.15 |
| 2007/0256648 A1 * | 11/2007 | Sun et al. ..................... | 123/1 A |

FOREIGN PATENT DOCUMENTS

| | | |
|---|---|---|
| JP | 2000-130204 A | 5/2000 |
| JP | 2003-250202 A | 9/2003 |

* cited by examiner

*Primary Examiner*—John T Kwon
(74) *Attorney, Agent, or Firm*—Kenyon & Kenyon LLP

(57) ABSTRACT

An engine ECU executes a program including a step of detecting an opening degree of an accelerator pedal and a state of a power generation command to MG, if a KCS feedback execution condition is met, and a step of detecting a KCS feedback correction amount eakcs, if the accelerator is off and if during power generation load operation, and then substituting a constant AKCSI for eakcs, if eakcs is larger than a threshold value and the ignition timing is on the advance side. Since the KCS feedback correction amount eakcs is adjusted not to be excessively on the advance side, the ignition timing can be retarded promptly at the time of accelerator on, thereby avoiding occurrence of knocking.

10 Claims, 4 Drawing Sheets

CONTROL DEVICE OF HYBRID VEHICLE

This nonprovisional application is based on Japanese Patent Application No. 2006-290222 filed with the Japan Patent Office on Oct. 25, 2006, the entire contents of which are hereby incorporated by reference.

BACKGROUND OF THE INVENTION

1. Field of the Invention

The present invention relates to a hybrid vehicle having an internal combustion engine serving as a traveling source of the vehicle and also having another traveling source, and more particularly to control of avoiding knocking of an internal combustion engine in a case where an electricity storage mechanism as another traveling source has to be charged by operating a power generator by the internal combustion engine in idle off.

2. Description of the Background Art

A hybrid vehicle is put into practical use which includes an engine operated by combustion energy of fuel and a motor operated by electrical energy, as motive power sources during vehicle travel, and is provided with an automatic transmission between the motive sources and the drive wheels. In such a hybrid vehicle, a fuel consumption amount or a gas emission amount can be reduced with prescribed traveling performance being kept, for example, by separately using the engine and the motor for traveling depending on the driving conditions. Specifically, a plurality of driving modes with different operation conditions of an engine and a motor are provided, including an engine travel mode of traveling only using an engine as a motive power source, a motor travel mode of traveling only using a motor as a motive power source, an engine+motor travel mode of traveling using both an engine and a motor as motive power sources, and the like. The driving modes are automatically switched according to a predetermined mode switch condition such as a motive power source map using such driving conditions as a vehicle speed (or the rotational speed of the motive power source) and an acceleration operation amount as parameters.

In order to supply electricity to this motor, an electricity storage mechanism is mounted on such a hybrid vehicle. As an electricity storage mechanism, in general, a secondary battery is often mounted for such reasons as energy density and charging/discharging efficiency. As the kinds of this secondary battery, a high-voltage nickel metal hydride battery, a lithium ion battery, and the like are used. It is noted that a motor generator is used as a motor for traveling to perform a regenerative operation of energy at a time of braking, thereby improving a fuel consumption rate. Here, the electricity storage mechanism may be a capacitor.

On the other hand, in an engine including a spark plug, ignition timing control is performed in order to obtain an output obtained by combustion efficiently as much as possible and to obtain better emission cleaning performance and fuel efficiency performance. Here, in order to obtain energy produced by combustion as an output most efficiently, it is known that the pressure peak in the interior of a combustion chamber preferably occurs slightly behind the compression top dead center. Therefore, the ignition timing is determined such that the pressure peak occurs slightly behind the compression top dead center, and if the ignition timing is too early (advanced too much), knocking is caused.

The ignition timing at which an engine produces the maximum torque is called MBT (Minimum spark advance for Best Torque) and, MBT is in proximity of the ignition timing at which knocking starts occurring, though depending on the kind or the rotational speed of the engine. Then, a Knock Control System (KCS) is mounted so that the optimum output is obtained while knocking is suppressed. The Knock Control System repeats a gradual advance in a case where no knocking occurs, a gradual retard until knocking stops when knocking is detected, and a gradual advance again when knocking stops.

In other words, knocking is suppressed by performing retard correction on the ignition timing based on the correction amount increased and decreased depending on whether knocking occurs or not and thus suppressing a temperature increase of the combustion chamber. The reason why a temperature increase in the combustion chamber can be suppressed by such retard correction of the ignition timing is that the combustion period of fuel-air mixture in the combustion engine is shifted to the retard side by retarding the ignition timing, so that the fuel-air mixture is sent as emissions to the emission path with its high combustion temperature being kept, and the heat during combustion of the fuel-air mixture is less likely to be transferred to the combustion chamber. It is noted that the ignition timing at the limit at which knocking does not occur is called the knock limit ignition timing.

In the normal ignition timing control, the ignition timing is controlled using a basic ignition timing that is predetermined depending on the driving conditions, and a KCS correction amount which is the amount of correction from this basic ignition timing to the knock limit ignition timing. In other words, the control is performed with the ignition timing=the basic ignition timing+the KCS correction amount (this KCS correction amount is, for example, the basic advance amount+the corrective advance amount). Of course, the KCS correction amount may be the basic retard amount+the corrective retard amount.

Japanese Patent Laying-Open No. 2000-130204 discloses a control device which avoids an increase of the emission temperature by the retard correction of the ignition timing as measures against knocking of the engine in a hybrid vehicle and also compensates for reduction of the engine output at the time of knocking control. This control device controls a hybrid vehicle including an internal combustion engine and an electric rotating machine as motive power devices and including a variable valve device variably controlling the intake valve operation timing of the internal combustion engine depending on the driving conditions and a knocking detection device detecting occurrence of knocking of the internal combustion engine. This control device controls the intake valve operation timing by the variable valve device and the output of the electric rotating machine depending on the knocking occurrence state. This control device is configured to control the intake valve operation timing in the retard direction from the basic operation timing during occurrence of knocking and also compensate for the reduced output of the internal combustion engine due to this retard control using the electric rotating machine.

According to this control device of a hybrid vehicle, the intake valve operation timing (in particular, the valve closing timing) is controlled in the retard direction from the basic operation timing during occurrence of knocking. Accordingly, the intake air filling rate and the effective compression ratio are reduced, thereby eliminating knocking. The knocking intensity can also be alleviated by delaying either the ignition timing or the intake valve operation timing. On the other hand, while retarding the ignition timing increases the emission temperature, retarding the intake valve operation timing tends to reduce the emission temperature. Therefore, knocking can be eliminated by delaying the intake valve operation timing without increasing the emission temperature. Furthermore, in addition to retarding the intake valve operation timing in this manner, the electric rotating machine compensates for the reduced output of the internal combustion engine due to this retard control, which ensures the good driving performance while avoiding knocking.

Now, in the hybrid vehicle as described above, when the engine is operated, the electric storage mechanism is sometimes charged by operating the motor generator as a power generator with the accelerator off (idle on). In this case, the ignition timing control is performed by KCS such that the ignition timing is advanced in order to stabilize the idle state, using the aforementioned corrective advance amount. Therefore, in the idle state and in a minute-load operation state in which the motor generator is operated with the rotational force of the engine, the ignition timing is controlled toward the advance side by KCS, and in some cases, the KCS feedback value may stay on the upper limit guard value. In this case, if the driver of the hybrid vehicle heavily depresses the accelerator pedal (rapidly accelerates the vehicle), the load of the engine increases drastically, and it takes much time for the KCS feedback value to reduce (delay due to the feedback control), causing a delay before the finally calculated ignition timing is controlled toward the retard side. For example, the KCS feedback value is not reflected on the final ignition timing until it falls to the median value or smaller of the KCS feedback value, and knocking continuously occurs until then.

However, the aforementioned Japanese Patent Laying-Open No. 2000-130204 only copes with an increase of the emission temperature and an engine output reduction caused by the retard correction of the ignition timing for avoiding knocking and does not mention the knocking caused when the accelerator is turned on in the state in which the ignition timing is changed toward the advance side by KCS when the engine is under a minute load in the idle state.

SUMMARY OF THE INVENTION

The present invention is made to solve the aforementioned problem, and an object of the present invention is to provide a control device of a hybrid vehicle including an engine and an electric rotating machine operated by electric power supplied from an electricity storage mechanism, as traveling sources of the vehicle, for avoiding occurrence of knocking resulting from a knock control process during power generation by the engine in the idle state, wherein electric power generated by the electric rotating machine operated by the engine is stored in the electricity storage mechanism.

A control device in accordance with the present invention controls a hybrid vehicle including an engine and an electric rotating machine operated by electric power supplied from an electricity storage mechanism, as traveling sources of the vehicle, wherein electric power generated by the electric rotating machine operated by the engine or drive wheels is stored in the electricity storage mechanism. The control device includes: a knock control mechanism controlling an ignition timing so that knocking does not occur in the engine; a determination portion determining whether or not the electric rotating machine is operated by the engine to generate electric power; a detection portion detecting a state of an accelerator pedal of the hybrid vehicle; and a control portion controlling the knock control mechanism so that a change of an ignition timing toward an advance side by the knock control mechanism is avoided, in a state in which the accelerator pedal is not depressed and in which the electric rotating machine is operated by the engine to generate electric power.

According to the present invention, a motor generator which is the electric rotating machine mounted on the hybrid vehicle is operated by the engine to generate electric power. During operation of the engine, the ignition timing is controlled by the knock control mechanism. For example, in the state of accelerator off (the state in which the accelerator pedal is not depressed, which is the idle ON state), the knock control mechanism advances the ignition timing to stabilize the idle state. Even when the motor generator is operated by the engine, the ignition timing is advanced. When the accelerator on state (the state in which the accelerator pedal is depressed, which is the idle OFF state) is brought about in this state, the knock control mechanism only retards the ignition timing by a certain angle by the feedback control. Therefore, if the ignition timing is changed excessively toward the advance side in the accelerator off state (if the KCS feedback correction amount stays at the upper limit guard value on the advance side), the ignition timing is not retarded quickly even when a transition to the accelerator on state takes place and knocking occurs. Therefore, in the accelerator off state and in the state in which the engine allows the motor generator to operate to generate electric power, a change of the ignition timing toward the advance side by the knock control mechanism is avoided. Thus, in the accelerator off state and in the state in which the engine allows the motor generator to operate to generate electric power, the ignition timing is not excessively advanced (the KCS feedback correction amount is not excessively on the advance side). Therefore, even if a transition to the accelerator on state takes place and knocking occurs, the ignition timing is retarded quickly, thereby avoiding knocking. As a result, it is possible to provide a control device of a hybrid vehicle for avoiding occurrence of knocking resulting from knock control processing when electric power is generated by the engine in the idle state.

Preferably, the control portion avoids a change of the ignition timing toward an advance side by limiting an operation of the knock control mechanism.

According to the present invention, the operation of the knock control mechanism is limited so that a change of the ignition timing excessively toward the advance side is avoided. Therefore, even if a transition to the accelerator on state takes place and knocking occurs, the ignition timing is retarded quickly, thereby avoiding knocking.

Further preferably, the control portion limits an operation of the knock control mechanism so that the ignition timing can be retarded quickly when the accelerator pedal is depressed.

According to the present invention, the operation of the knock control mechanism is limited so that the ignition timing can be retarded quickly when the accelerator pedal is depressed. Therefore, even if a transition to the accelerator on state takes place and knocking occurs, the ignition timing is retarded quickly, thereby avoiding knocking.

Further preferably, the control portion avoids a change of the ignition timing toward an advance side by limiting an ignition timing correction amount in the knock control mechanism.

According to the present invention, a change of the ignition timing correction amount excessively toward the advance side in the knock control mechanism is avoided. Therefore, even if a transition to the accelerator on state takes place and knocking occurs, the ignition timing is retarded quickly, thereby avoiding knocking.

Further preferably, the control portion limits the ignition timing correction amount in the knock control mechanism so that the ignition timing can be retarded quickly when the accelerator pedal is depressed.

According to the present invention, a change of the ignition timing correction amount excessively toward the advance side in the knock control mechanism is avoided so that the ignition timing can be retarded quickly when the accelerator pedal is depressed. Therefore, even if a transition to the accelerator on state takes place and knocking occurs, the ignition timing is retarded quickly, thereby avoiding knocking.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
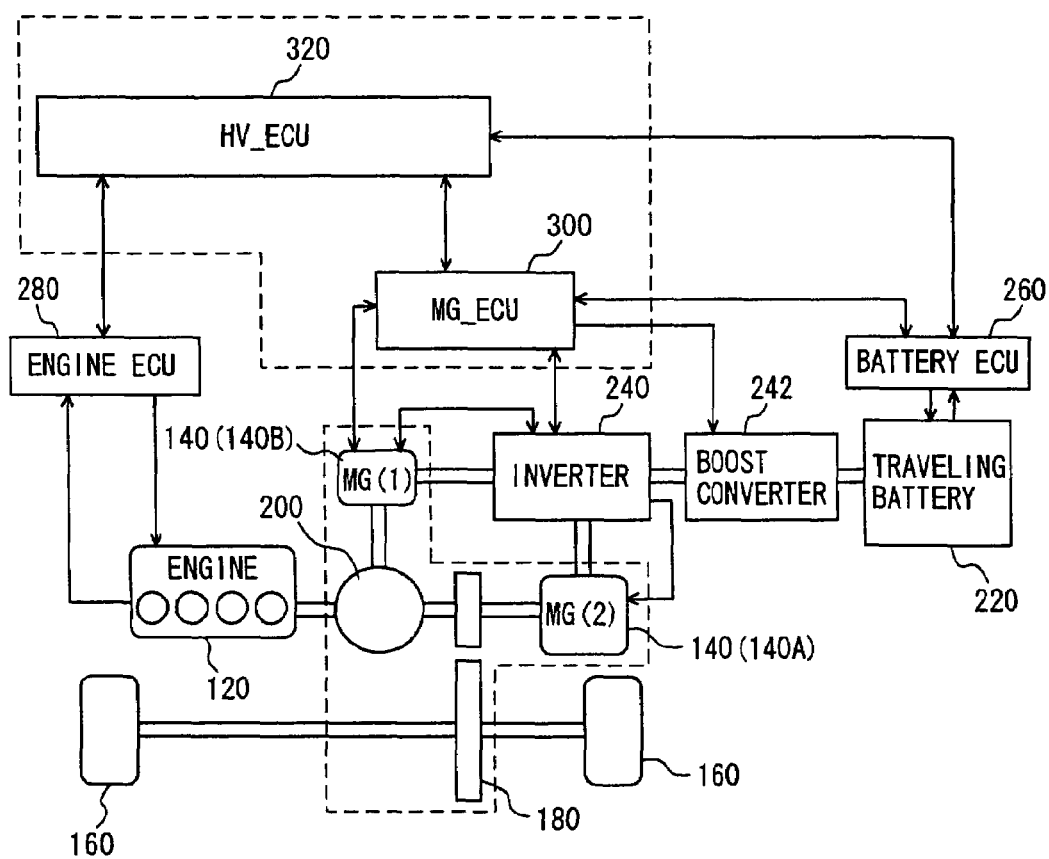
FIG. 1 is a control block diagram of a hybrid vehicle including a control device in accordance with an embodiment of the present invention.

In the following, an embodiment of the present invention will be described with reference to the figures. In the following description, the same parts will be denoted with the same reference characters. Their designations and functions are also the same. Therefore, the detailed description thereof will not be repeated.

Referring to FIG. 1, a control block diagram of the entire hybrid vehicle including an engine ECU which is a control device in accordance with the present embodiment will be described. It is noted that the present invention is not limited to the hybrid vehicle shown in FIG. 1. In the present invention, an internal combustion engine, for example, such as a gasoline engine, as a motive power source (an engine is assumed in the following description) is a driving source (traveling source) to allow the vehicle to travel and is a driving source of a generator. Furthermore, the present invention is applied to any vehicle that includes an engine and a motor generator as driving sources and travels by the motive power of the motor generator (regardless of whether the engine is stopped or not), or any hybrid vehicle equipped with a battery for traveling that has another manner (the present invention is not limited to the so-called series-type or parallel-type hybrid vehicles). This battery is a nickel metal hydride battery, a lithium ion battery, or the like, and the kind is not particularly limited. Furthermore, the battery may be replaced by a capacitor.

The hybrid vehicle includes an engine 120 and a motor generator (MG) 140. Although in the following, for convenience of explanation, motor generator 140 is represented as a motor generator 140A (or MG(2) 140A) and a motor generator 140B (or MG(1) 140B), motor generator 140A may function as a generator and motor generator 140B may function as a motor, depending on the traveling condition of the hybrid vehicle. When this motor generator functions as a generator, regenerative braking is performed. When the motor generator functions as a generator, kinetic energy of the vehicle is converted into electrical energy and the vehicle is then decelerated.

The hybrid vehicle additionally includes a speed reducer 180 transmitting motive power generated in engine 120 or motor generator 140 to drive wheels 160 or transmitting drive of drive wheels 160 to engine 120 or motor generator 140, a power split mechanism (for example, planetary gear mechanism as described later) 200 splitting motive power generated by engine 120 into two paths of drive wheels 160 and motor generator 140B (MG(1) 140B), a traveling battery 220 storing electric power for driving motor generator 140, an inverter 240 performing current control while converting DC current of traveling battery 220 and AC current of motor generator 140A (MG(2) 140A) and motor generator 140B (MG(1) 140B), a battery control unit (referred to as battery ECU (Electronic Control Unit) hereinafter) 260 managing and controlling the charging/discharging state (for example, SOC (State Of Charge)) of traveling battery 220, an engine ECU 280 controlling an operation state of engine 120, an MG_ECU 300 controlling motor generator 140 and battery ECU 260, inverter 240 and the like according to the state of the hybrid vehicle, an HV_ECU 320 controlling the entire hybrid system so that the hybrid vehicle can run most efficiently by managing and controlling battery ECU 260, engine ECU 280 and MG_ECU 300 and the like relatively to each other, and so on.

In the present embodiment, a boost converter 242 is provided between traveling battery 220 and inverter 240. Since the rated voltage of traveling battery 220 is lower than the rated voltage of motor 140A (MG(2) 140A) or motor generator 140B (MG(1) 140B), power is boosted by boost converter 242 when power is supplied from traveling battery 220 to motor generator 140A (MG(2) 140A) or motor generator 140B (MG(1) 140B).

It is noted that although each ECU is separately configured in FIG. 1, ECU may be configured such that two or more ECU are integrated together (for example, as indicated by a dotted line in FIG. 1, ECU may be configured such that MG_ECU 300 and HV_ECU 320 are integrated together, as an example).

Power split mechanism 200 uses a planetary gear mechanism to distribute motive power of engine 120 to both of drive wheels 160 and motor generator 140B (MG(1) 140B). Power split mechanism 200 also functions as a continuously variable transmission by controlling the rotational speed of motor generator 140B (MG(1) 140B). The rotational force of engine 120 is input to a carrier (C) and is then transferred to motor generator 140B (MG(1) 140B) by a sun gear (S) and to motor generator 140A (MG(2) 140A) and an output shaft (on the drive wheels 160 side) by a ring gear (R). When engine 120 during rotation is to be stopped, as engine 120 is rotating, the kinetic energy of this rotation is converted into electrical energy by motor generator 140B (MG(1) 140B) thereby reducing the rotational speed of engine 120.

In the hybrid vehicle equipped with the hybrid system as shown in FIG. 1, when a predetermined condition for the vehicle state is met, HV_ECU 320 controls engine 120 through motor generator 140A (MG(2) 140A) and engine ECU 280 so that the hybrid vehicle travels only with motor generator 140A (MG(2) 140A) of motor generator 140. For example, the predetermined condition is a condition that SOC of traveling battery 220 has a predetermined value or more. In this way, at the start-up, during low-speed traveling, or the like when the efficiency of engine 120 is poor, the hybrid vehicle can travel only with motor generator 140A (MG(2) 140A). As a result, SOC of traveling battery 220 can be reduced.

It is noted that after SOC of traveling battery 220 is reduced, traveling battery 220 can be charged during a vehicle stop. Here, motor generator 140 operates as a generator with engine 120 in the idle state with a minute load (minute as compared when the vehicle is traveling).

Furthermore, during a normal traveling, motive power of engine 120 is divided into two paths, for example, by power split mechanism 200, and drive wheels 160 are directly driven, on one hand, and motor generator 140B (MG(1) 140B) is driven to generate electric power, on the other hand. Here, motor generator 140A (MG(2) 140A) is driven by the generated electric power to assist driving drive wheels 160. In addition, during a high-speed traveling, electric power from traveling battery 220 is additionally supplied to motor generator 140A (MG(2) 140A) to increase the output of motor generator 140A (MG(2) 140A) thereby adding the driving force to drive wheels 160. On the other hand, during deceleration, motor generator 140A (MG(2) 140A) driven by drive wheels 160 functions as a generator to perform regenerative power generation, and the recovered electric power is stored in traveling battery 220. Here, when the charge amount of traveling battery 220 is reduced and charging is particularly required, the output of engine 120 is increased so that the amount of electricity generated by motor generator 140B (MG(1) 140B) is increased thereby increasing the charge amount for traveling battery 220.

Furthermore, the target SOC of traveling battery 220 is usually set at about 60% so that energy can be recovered whenever regenerative operation is performed. In addition, the upper limit value and the lower limit value of SOC are usually set, for example, such that the control upper limit value is 80% and the control lower limit value is 30%, in order to prevent battery degradation of traveling battery 220, and HV_ECU 320 controls electric power generation, regenerative operation, and motor output by motor generator 140 through MG_ECU 300 so that SOC does not go beyond the upper limit value and the lower limit value. It is noted that the values shown here are only examples and are not specifically limited values.

Figure 2:
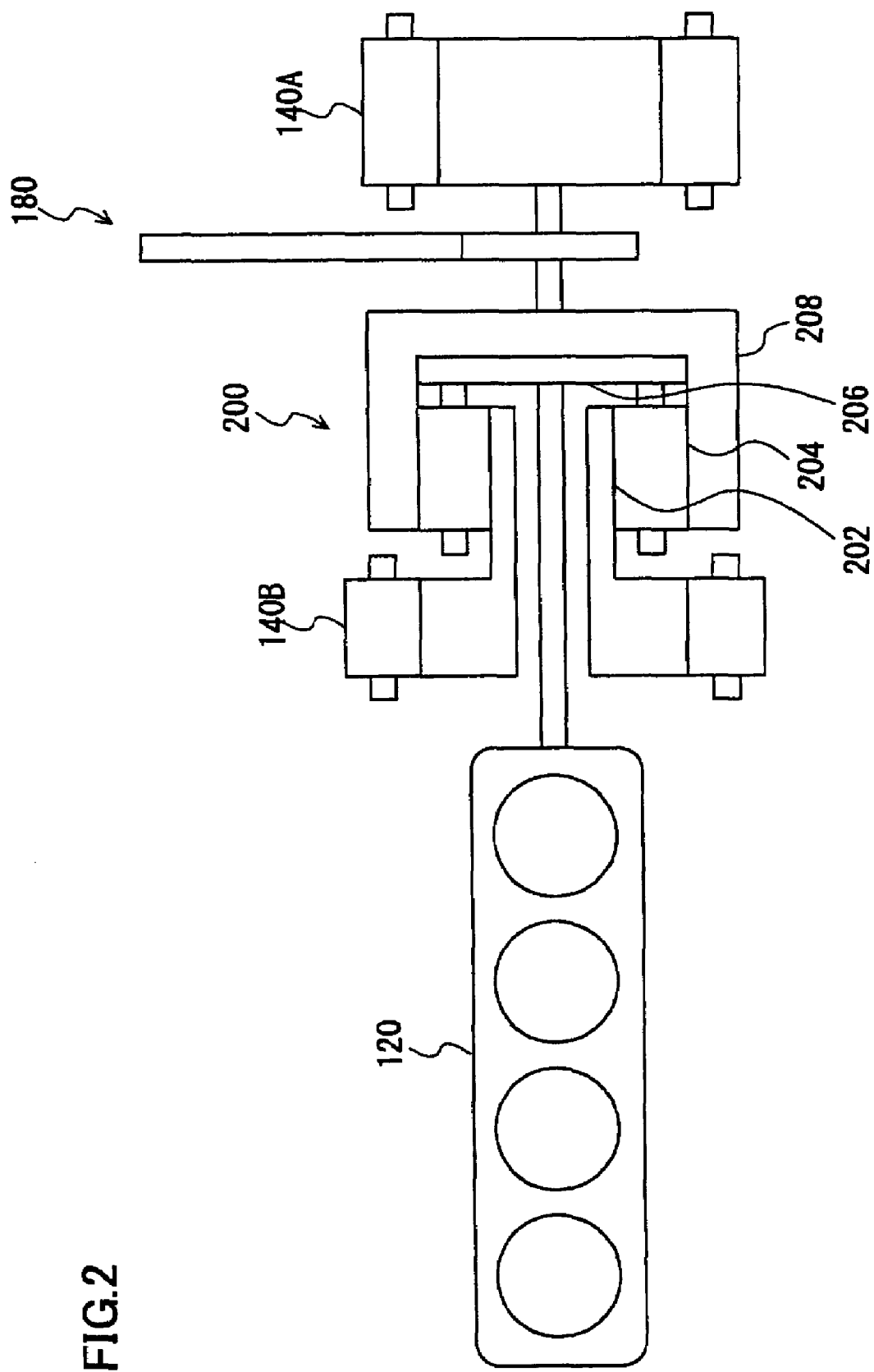
FIG. 2 is a diagram showing a power split mechanism in FIG. 1.

Referring to FIG. 2, power split mechanism 200 will be described further. Power split mechanism 200 is formed of a planetary gear including a sun gear (S) 202 (simply referred to as sun gear 202 hereinafter), a pinion gear 204, a carrier (C) 206 (simply referred to as carrier 206 hereinafter), and a ring gear (R) 208 (simply referred to as ring gear 208).

Pinion gear 204 is engaged with sun gear 202 and ring gear 208. Carrier 206 supports pinion gear 204 such that it can rotate on its axis. Sun gear 202 is coupled to the rotation shaft of MG (1) 140B. Carrier 206 is coupled to the crankshaft of engine 120. Ring gear 208 is coupled to the rotation shaft of MG(2) 140A and speed reducer 180.

Engine 120, MG(1) 140B and MG(2) 140A are coupled through power split mechanism 200 formed of a planetary gear, so that the rotational speeds of engine 120, MG(1) 140B and MG(2) 140A are in the linearly-coupled relation in an alignment chart.

Figure 3:
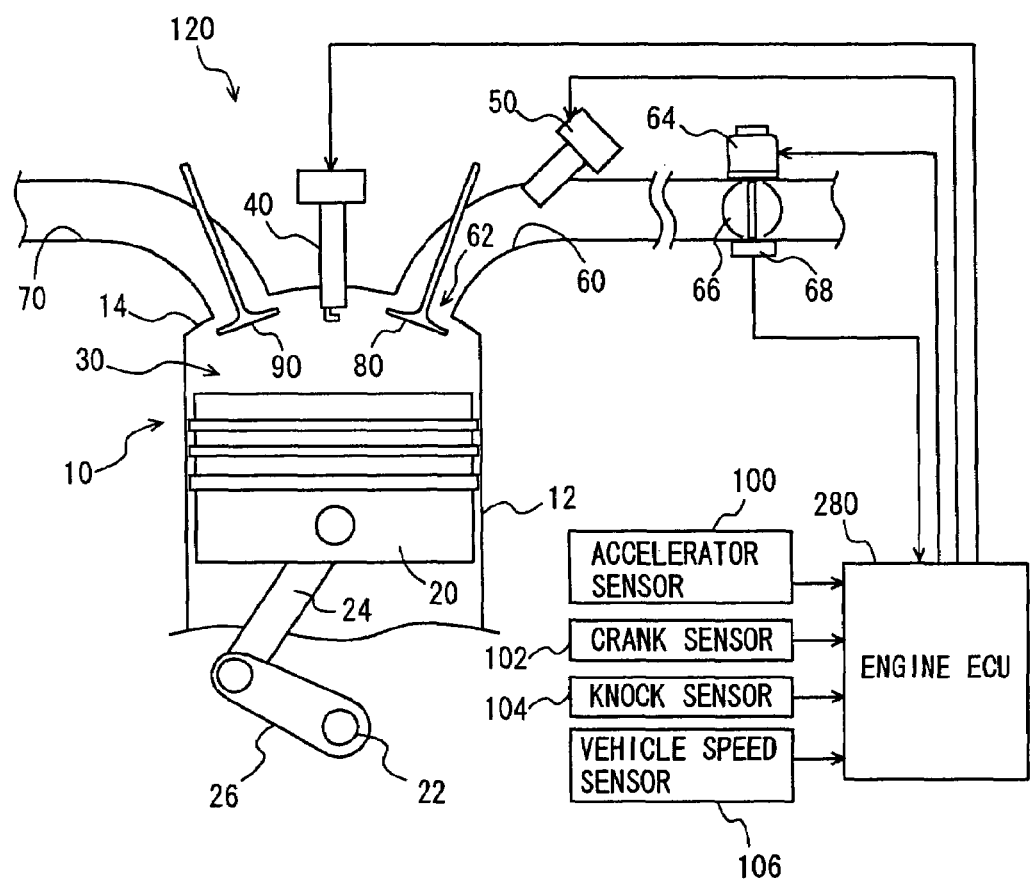
FIG. 3 is a diagram showing a configuration of an engine controlled by an engine ECU which is the control device in accordance with the embodiment of the present invention.

FIG. 3 shows one of four cylinders shown in FIG. 1. Engine 120 is configured to have a cylinder 10 including a cylinder block 12 and a cylinder head 14 coupled to the upper portion of cylinder block 12 and a piston 20 reciprocating in cylinder 10. This piston 20 is configured in such a manner that a connecting rod 24 and a crank arm 26 are coupled to a crankshaft 22 which is the output shaft of engine 120 and that connecting rod 24 allows the reciprocating motion of piston 20 to be converted into the rotation of crankshaft 22. Then, in cylinder 10, a combustion chamber 30 for burning fuel-air mixture is partitioned by the inner wall of cylinder block 12 and cylinder head 14 and the top face of the piston.

An ignition plug 40 igniting fuel-air mixture is disposed in cylinder head 14 in such a manner as to protrude into this combustion chamber 30. In addition, an intake manifold 60 and an exhaust manifold 70 are in communication with combustion chamber 30 through an intake valve 80 and an exhaust valve 90, respectively. An intake manifold injection injector 50 is attached to intake manifold 60 for injecting and supplying fuel to an intake port 62, which is a communication portion between intake manifold 60 and combustion chamber 30, or/and intake manifold 60.

In addition, an accelerator sensor 100, a crank sensor 102, a knock sensor 104 and a vehicle speed sensor 106 are provided for engine 120.

Accelerator sensor 100 is a sensor provided in proximity of a not-shown accelerator pedal for detecting the opening degree (the depression amount) thereof, and the detected value is A/D converted as appropriate by engine ECU 280 and thereafter taken in by engine ECU 280. It is noted that accelerator sensor 100 may be replaced by an idle switch which indicates, by on-state, the idle state in which the accelerator pedal is not depressed.

Crank sensor 102 is configured to include a rotor mounted on crankshaft 22 of engine 120 and an electromagnetic pickup disposed in proximity thereof for detecting passage of a protrusion provided on the outer circumference of the rotor. Crank sensor 102 is a sensor for detecting the rotational phase (crank angle) of crankshaft 22 and the rotational speed of engine 120. The output of crank sensor 102 has a waveform shaped as appropriate by engine ECU 280 and thereafter taken in by engine ECU 280, as a pulse signal (NE pulse) corresponding to the rotational speed of crankshaft 22.

Vehicle speed sensor 106 detects an output shaft rotational speed NOUT of the automatic transmission. Engine ECU 280 can calculate a vehicle speed by multiplying this output shaft rotational speed NOUT by the final gear ratio. It is noted that vehicle speed sensor 106 may detect a vehicle speed directly.

Furthermore, an air cleaner (not shown), an airflow meter (not shown) and a throttle valve 66 are provided for intake manifold 60, in order from the upstream. Throttle valve 66 is provided with a throttle motor 64 and a throttle position sensor 68.

The air sucked from the air cleaner passes through intake manifold 60 and circulates in engine 120. In the midway of intake manifold 60, throttle valve 66 is provided. Throttle valve 66 is opened and closed by the operation of throttle motor 64. Here, the opening degree of throttle valve 66 can be detected by throttle position sensor 68. In intake manifold 60 between the air cleaner and throttle valve 66, the airflow meter is provided to detect the amount of sucked air. The airflow meter transmits an intake amount signal indicating the amount of sucked air Q to engine ECU 280. In addition, a temperature sensor is provided to the airflow meter and transmits an intake temperature signal indicating the temperature of sucked air TA to engine ECU 280.

Knock sensor 104 is provided to cylinder block 12 of engine 120. This knock sensor 104 is a sensor detecting vibration including knocking caused in engine 120. The output of knock sensor 104 is taken in by engine ECU 280, as a knock signal according to the magnitude of the vibration.

Engine ECU 280 includes, first of all, a CPU (Central Processing Unit) functioning as a microcomputer, and a memory for temporarily storing a variety of data and processing results, and a driver (drive circuit) for driving a variety of actuators and the like. Then, based on the engine operation state grasped from a detection signal from each sensor, control is performed for the ignition timing of ignition plug 40 and the fuel injection from intake manifold injection injector 50.

Engine ECU 280 operates as a knock control system (KCS) which avoids occurrence of knocking in engine 120. Here, knocking avoidance by the knock control system will be described in detail.

Assuming that a period of time during which knocking in engine 120 may occur, that is, a period in the vicinity of the compression top dead center (compression stroke) of each cylinder and after the end of the ignition timing, is a knock determination period (gate), engine ECU 280 identifies vibration unique to knocking from a detection signal from knock sensor 104 corresponding to vibration of cylinder block 12 during the knock determination period. In more detail, the number of times the output peak value from knock sensor 104 exceeds a determination reference value is counted during the knock determination period, and when the number of times is equal to or larger than a prescribed value, it is determined that vibration unique to knocking occurs. Then, based on this determination, knocking is detected.

As described above, when knocking is detected, engine ECU 280 performs retard correction of the ignition timing (correction by adding the KCS correction amount to the basic ignition timing to retard the ignition timing) thereby avoiding knocking. Specifically, the retard amount of the ignition timing is increased for each knocking detection, and when knocking is not detected, the ignition timing is controlled toward the advance side by decreasing this retard amount. Of course, when knocking is not detected, the ignition timing is controlled toward the advance side similarly by increasing the advance amount, where the ignition timing is set as the basic ignition timing+the KCS correction amount (this KCS correction amount is the basic advance amount+the corrective advance amount).

Because of such ignition timing control, the ignition timing is adjusted toward the knocking limit, so that the output of engine 120 can be increased as much as possible while knocking is avoided. As for the retard amount of the ignition timing, the upper limit of the retard amount is guarded with a preset guard value so that the ignition timing is not excessively retarded, for example, when knocking frequently occurs. Similarly, the upper limit of the advance amount is also guarded with a preset guard value so that the ignition timing is not excessively advanced.

Engine ECU 280 in accordance with the present embodiment controls the ignition timing by KCS even when engine 120 is operated and motor generator 140 is operated as a power generator with the accelerator off (idle on) to charge traveling battery 220. In such a case, the ignition timing is controlled such that the ignition timing is advanced using the aforementioned corrective advance amount so as to stabilize the idle state. Therefore, in the idle state and in the minute-load operation state in which motor generator 140 is operated by the rotational force of engine 120, the ignition timing is controlled toward the advance side by KCS, and in some cases, the KCS feedback value (or the ignition timing itself) may stay at the upper limit guard value.

In such a case, when the driver of the hybrid vehicle hardly depresses the accelerator pedal (rapidly accelerates the vehicle), the load of the engine increases drastically, and it takes much time to reduce the KCS feedback value (delay due to the feedback control), causing a delay before the finally calculated ignition timing is controlled toward the retard side. Therefore, when detecting the minute load during this idle state, engine ECU 280 forcibly changes the KCS feedback value changed excessively to the advance side, for example, to the median value or lower of the KCS feedback value.

Figure 4:
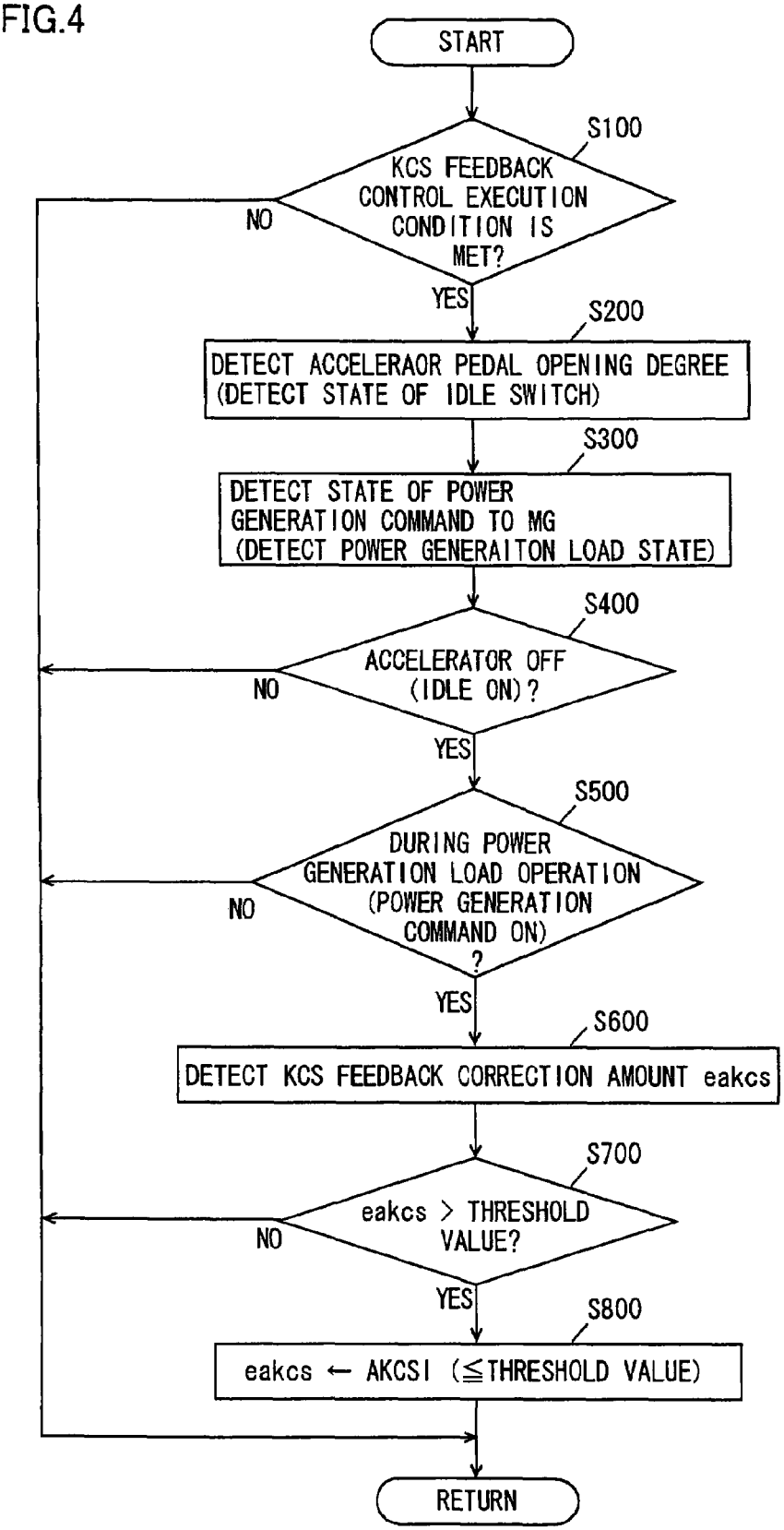
FIG. 4 is a flowchart showing a control structure of a program executed in the engine ECU which is the control device in accordance with the embodiment of the present invention.

Referring to FIG. 4, a control structure of a program executed in engine ECU 280 will be described. It is noted that this program is repeatedly executed at a predetermined cycle time.

In step (step will be referred to as S hereinafter) 100, engine ECU 280 determines whether or not the KCS feedback control execution condition is met. This determination is made based on a signal input to engine ECU 280 and the result of processing using the signal. If it is determined that the KCS feedback control execution condition is met (YES in S100), the process proceeds to step S200. If not (NO in S100), this process ends.

In S200, engine ECU 280 detects the opening degree of the accelerator pedal. Here, engine ECU 280 detects the opening degree of the accelerator pedal based on a signal input from accelerator sensor 100. It is noted that engine ECU 280 may detect the state of the idle switch (the state in which the idle switch is on in a state in which the accelerator pedal is not depressed, which state may be referred to as the idle ON state, hereinafter) indicating the state in which the accelerator pedal is not depressed (the state in which the accelerator pedal opening degree is 0).

In S300, engine ECU 280 detects a state of an electric power generation command to motor generator 140. When the electric power generation command is output to motor generator 140, it can be detected that engine 120 is in the power generation load state (the state during the power generation load operation, and this state may be referred to as the power generation command ON state hereinafter). Here, engine ECU 280 receives command signals to inverter 240 and boost converter 242 as input from MG_ECU 300 through HV_ECU 320 and detects the state of power generation command to motor generator 140, based on these command signals. It is noted that signals indicating the state of power generation command to motor generator 140 may be received from HV_ECU 320 and MG_ECU 300.

In S400, engine ECU 280 determines whether the detected accelerator opening degree is 0 or not, that is, whether in the idle ON state or not. If the accelerator opening degree is 0 and in the idle ON state (YES in S400), the process proceeds to S500. If not (NO in S400), this process ends.

In S500, engine ECU 280 determines whether during the load operation or not, that is, whether in the power generation command ON state or not. If during the load operation and in the power generation command ON state (YES in S500), the process proceeds to S600. If not (NO in S500), this process ends.

In S600, engine ECU 280 detects a KCS feedback correction amount eakcs calculated by engine ECU 280 (here, the advance amount, which may stay up to the upper limit guard value). It is noted that a KCS control program is executed concurrently with the program of the flowchart shown in this FIG. 4.

In S700, engine ECU 280 determines whether the KCS feedback correction amount eakcs is larger than a threshold value. This threshold value is set, for example, at the median value (specifically, half the upper limit guard value on the advance side) of the KCS feedback value. It is noted that this threshold value may be the KCS feedback correction amount obtained when the ignition timing is set at the median value between the upper limit guard value on the advance side and the upper limit guard value on the retard side, or the KCS feedback correction amount obtained when the ignition timing is the basic ignition timing. If the KCS feedback correction amount eakcs is larger than a threshold value (YES in S700), the process proceeds to S800. If not (NO in S800), this process ends.

In S800, engine ECU 280 substitutes a preset constant AKCSI for the KCS feedback correction amount eakcs. This constant AKCSI is at least equal to or less than a threshold value.

In the hybrid vehicle equipped with engine 120 controlled by engine ECU 280 in accordance with the present embodiment based on the structure and flowchart as described above, the operation of avoiding knocking in a case where engine 120 exits from the idle state during electric power generation by operating motor generator 140 with engine 120 in the idle state will be described.

In the case where engine 120 is operating, in the normal state, the KCS feedback control execution condition is met (S100), in which when knocking is detected, the ignition timing is retarded by a certain angle until knocking stops, and when knocking is not detected, the ignition timing is advanced by a certain angle until knocking occurs, so that occurrence of knocking in engine 120 is avoided by KCS.

The accelerator pedal opening degree is detected (S200) and the state of power generation command to motor generator 140 is detected. When in the idle ON state with the accelerator off and when the power generation command during the power generation load operation is ON state (YES in S400 and YES in S500), motor generator 140 is operated by engine 120 to generate electric power. Thus, although the load of engine 120 exists, the load amount is minute. In other words, the load of engine 120 is only motor generator 140, which is a minute load, and the rotational speed of engine 120 is low, so that the ignition timing of engine 120 is advanced in order to stabilize the idle state. Therefore, the KCS feedback correction amount eakcs is assumed to be in proximity of the upper limit guard on the advance side.

The KCS feedback correction amount eakcs is detected (S600) and the KCS feedback correction amount eakcs has a value in proximity of the upper limit guard value on the advance side and larger than a threshold value (YES in S700), so that the constant AKCSI set smaller enough than the upper limit guard value on the advance side is substituted for the KCS feedback correction amount eakcs.

Therefore, even when the driver of this hybrid vehicle thereafter depresses the accelerator pedal to bring about the idle OFF state, the KCS feedback correction amount has a value not so much on the advance side. Thus, when knocking is detected, the final ignition timing is retarded quickly, thereby avoiding knocking.

As described above, in the hybrid vehicle equipped with an engine and a generator operated by the engine, in a circumstance in which the engine is in the idle state and the ignition timing is advanced by KCS, even when a traveling load occurs in the engine, the final ignition timing can be retarded at an earlier stage, because the correction amount on the advance side of the KCS feedback correction amount is limited. Thus, occurrence of knocking can be avoided.

In the foregoing embodiment, if YES in S400 and YES in S500, the constant value SKCSI is substituted for the KCS feedback correction amount eakcs to avoid the KCS feedback correction amount from taking on a value on the advance side (staying at the upper limit guard value on the advance side). However, the present invention is not limited such processing. For example, if YES in S400 and YES in S500, the controlling the ignition timing toward the advance side may be halted per se, or controlling the ignition timing toward the advance side beyond the median value on the advance side of the KCS feedback correction amount may be prohibited. In other words, the present invention includes all the manners for the process of limiting correction of the ignition timing toward the advance side by KCS, if YES in S400 and YES in S500.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control device of a hybrid vehicle including an engine and an electric rotating machine operated by electric power supplied from an electricity storage mechanism, as traveling sources of the vehicle, wherein electric power generated by said electric rotating machine operated by said engine or drive wheels is stored in said electricity storage mechanism, comprising:
   a knock control mechanism controlling an ignition timing so that knocking does not occur in said engine;
   a determination portion determining whether or not said electric rotating machine is operated by said engine to generate electric power;
   a detection portion detecting a state of an accelerator pedal of said hybrid vehicle; and
   a control portion controlling said knock control mechanism so that a change of an ignition timing toward an advance side by said knock control mechanism is avoided, in a state in which said accelerator pedal is not depressed and in which said electric rotating machine is operated by said engine to generate electric power.

2. The control device of a hybrid vehicle according to claim 1, wherein said control portion avoids a change of said ignition timing toward an advance side by limiting an operation of said knock control mechanism.

3. The control device of a hybrid vehicle according to claim 2, wherein said control portion limits an operation of said knock control mechanism so that said ignition timing can be retarded quickly when said accelerator pedal is depressed.

4. The control device of a hybrid vehicle according to claim 1, wherein said control portion avoids a change of said ignition timing toward an advance side by limiting an ignition timing correction amount in said knock control mechanism.

5. The control device of a hybrid vehicle according to claim 4, wherein said control portion limits the ignition timing correction amount in said knock control mechanism so that said ignition timing can be retarded quickly when said accelerator pedal is depressed.

6. A control device of a hybrid vehicle including an engine and an electric rotating machine operated by electric power supplied from an electricity storage mechanism, as traveling sources of the vehicle, wherein electric power generated by said electric rotating machine operated by said engine or drive wheels is stored in said electricity storage mechanism, comprising:
   a knock control mechanism controlling an ignition timing so that knocking does not occur in said engine;
   determination means for determining whether or not said electric rotating machine is operated by said engine to generate electric power;
   detection means for detecting a state of an accelerator pedal of said hybrid vehicle; and
   control means for controlling said knock control mechanism so that a change of an ignition timing toward an advance side by said knock control mechanism is avoided, in a state in which said accelerator pedal is not depressed and in which said electric rotating machine is operated by said engine to generate electric power.

7. The control device of a hybrid vehicle according to claim 6, wherein said control means includes means for avoiding a change of said ignition timing toward an advance side by limiting an operation of said knock control mechanism.

8. The control device of a hybrid vehicle according to claim 7, wherein said control means includes means for limiting an operation of said knock control mechanism so that said ignition timing can be retarded quickly when said accelerator pedal is depressed.

9. The control device of a hybrid vehicle according to claim 6, wherein said control means includes means for avoiding a change of said ignition timing toward an advance side by limiting an ignition timing correction amount in said knock control mechanism.

10. The control device of a hybrid vehicle according to claim 9, wherein said control portion means includes means for limiting the ignition timing correction amount in said knock control mechanism so that said ignition timing can be retarded quickly when said accelerator pedal is depressed.

* * * * *